United States Patent [19]

Agarwal et al.

[11] 4,361,663

[45] Nov. 30, 1982

[54] PRESSURE SENSITIVE ADHESIVE COMPOSITIONS

[75] Inventors: Pawan K. Agarwal, Westfield, N.J.; Vincent L. Hughes, Baton Rouge, La.; Robert D. Lundberg, Bridgewater, N.J.

[73] Assignee: Exxon Research and Engineering Co., Florham Park, N.J.

[21] Appl. No.: 319,211

[22] Filed: Nov. 9, 1981

[51] Int. Cl.$^3$ .............................................. C08L 91/08
[52] U.S. Cl. ...................................... 524/62; 524/60; 524/66; 524/68; 524/71; 525/54.5
[58] Field of Search .................... 525/54.5; 524/60, 66, 524/62, 68, 71

[56] References Cited

U.S. PATENT DOCUMENTS 3,767,608 10/1973 Hand ...................................... 524/62
3,801,531 4/1974 Berejka et al. ...................... 524/490

Primary Examiner—Melvyn I. Marquis
Attorney, Agent, or Firm—Richard E. Nanfeldt

[57] ABSTRACT

This invention relates to pressure sensitive adhesive compositions which includes a hydrogenated block copolymer such as Kraton G, about 25 to about 250 parts by weight of a hydrocarbon resin of a petroleum or coal tar distillate, aliphatic dienes and mono- and diolefins, cyclic olefins of 5 or 6 carbon atoms and hydrogenated poly cyclics per 100 parts by weight of the hydrogenated block copolymer, and about 25 to 200 parts by weight of a polybutene or polyisobutylene per 100 parts of the hydrogenated block copolymer, wherein said mixture of Kraton G, said hydrocarbon resin and said polybutene or polyisobutylene are dissolved in a non-reactive solvent at a concentration level of about 5 to about 25 grams per 100 mil of non-reactive solvent.

5 Claims, No Drawings

PRESSURE SENSITIVE ADHESIVE COMPOSITIONS

BACKGROUND OF THE INVENTION

This invention relates to pressure sensitive adhesive compositions which includes a hydrogenated block copolymer such as Kraton G, about 25 to about 250 parts by weight of a hydrocarbon resin of a petroleum or coal tar distillate, aliphatic dienes and mono- and diolefins, cyclic olefins of 5 or 6 carbon atoms and hydrogenated polycyclics per 100 parts by weight of the hydrogenated block copolymer, and about 25 to 200 parts by weight of a polybutene or polyisobutylene per 100 parts of the hydrogenated block copolymer, wherein said mixture of Kraton G, said hydrocarbon resin and said polybutene or polyisobutylene are dissolved in a non-reactive solvent at a concentration level of about 5 to about 25 grams per 100 ml. of non-reactive solvent.

Broadly speaking, synthetic adhesives used in packaging can be classified into four categories: water based, solvent based, reactive and hot melt adhesives. Of these four, currently, the water based are used most extensively. Usually the water based adhesives are based on emulsion polymers and are applied to porous cellulosic substrates. Energy from the outside, in some fashion, is applied to the system to evaporate the water in order that a strong bond may be formed. Beside this energy requirement for the formation of the bond, there is another complication with the use of water based adhesive. For a uniform coating, a good uniform wetting of the substrate surface is desired, which is not easily achieved.

The key requirements for pressure sensitive adhesives are that they should have good cohesive and tackifying properties at ambient conditions. These adhesives should also have good flow characteristics if they are to be used in the bulk state, otherwise they should possess sufficient consistency when dissolved in suitable solvents so that they can be coated or sprayed on the surfaces to be bonded.

The key requirements of resins suitable for pressure sensitive adhesive applications are that they contribute (i) good tackifying characteristics for the polymer; and good physical properties, e.g., good tensile strength at ambient conditions for the formulations.

Certain commercial block copolymers such as Shell's Kraton, Phillip's Solprene and DuPont's EVA copolymers attain the above objectives to a good extent. The adhesives prepared from blends incorporating these polymers have very good adhesive and strength properties at room temperature and can be processed by conventional melt coating and extrusion techniques because of their good flow characteristics. Because of this excellent combination of properties exhibited by ABA type when B represents a polydiene or a polyolefin block, and A represents a polystyrene block at present, the use of Kratons for various pressure sensitive adhesive applications is growing in the industry.

However, the conventional block copolymers which are currently being used in adhesives technology, because of their inherent structure, have one serious drawback with respect to their use as a satisfactory adhesive candidate. Most of the conventional Kraton polymers are block copolymers of polystyrene and a polydiene. The polydiene component in Kratons (of industrial interest) is either polybutadiene or polyisoprene. Since both polybutadiene and polyisoprene are highly unsaturated, the Kraton block copolymers comprising either one of these two polymers are highly susceptible to thermal and oxidative degradation. This imposes many constraints on the adhesive users. For example, in order to minimize the degradation, presently, most often a packaging or a sealant adhesive user has to keep an inert blanket over the adhesive compound, not only during formulation and processing, which is usually done at somewhat elevated temperatures, but during storage as well. This becomes not only expensive, but at times cumbersome for the packager. Another point of caution experienced with the use of Kratons in adhesives is that the long term end use properties of the final product are highly susceptible to degradation due to UV light.

In order to circumvent these undesired properties of adhesives prepared using Kraton block copolymers, steps to modify the structure of these polymers have been taken. Recently, Shell has invented and developed a new generation of Kraton block copolymers in which the mid unsaturated blocks of either polybutadiene or polyisoprene are hydrogenated to yield a saturated mid block. The saturated mid block is stable, not only from a processing point of view, but from UV light during storage and use as well. In practice so far, it has been found that these new saturated mid block Kraton polymers are difficult to tackify. We have found that certain blends of saturated Kratons, when incorporated in certain proportions with selected Escorez resins, together with relatively low molecular weight polybutenes, yield systems which have very good tackifying characteristics. The aggressiveness of tack and other properties of these tertiary blends can be controlled by using carefully selected proportions of these blending ingredients and/or by incorporating certain fillers and plasticizers. All of these blends are mechanically compatible and have good flow properties, as judged during milling. They can also be applied from solution, if it is deemed necessary, for other processing reasons.

The excellent thermal stability inherent in the saturated backbone of Kraton is a very desirable property for adhesives which will be exposed to high temperatures for long times. Most adhesives based on other unsaturated elastomeric backbones can suffer degradation easily under those conditions.

SUMMARY OF THE INVENTION

This invention relates to pressure adhesive compositions, which includes a hydrogenated block copolymer such as Kraton G; about 25 to about 250 parts by weight of a hydrocarbon resin of a petroleum or coal tar distillate, aliphatic dienes and mono- and diolefins, cyclic olefins of 5 or 6 carbon atoms and hydrogenated polycyclics per 100 parts by weight of the hydrogenated block copolymer and about 25 to about 200 parts by weight of a polybutene or polyisobutylene per 100 parts of the hydrogenated block copolymer, wherein the mixture of said Kraton G, said hydrocarbon resin and said polybutene or polyisobutylene are dissolved in a non-reactive solvent at a concentration level of about 5 to about 25 grams per 100 ml. of non-reactive solvent.

GENERAL DESCRIPTION OF THE INVENTION

The present invention relates to unique and novel solvent based pressure sensitive adhesive compositions which comprise a blend of a hydrogenated block copolymer such as Kraton G, a polybutene or polyisobutylene and a hydrocarbon resin, wherein the mixture of said Kraton G, said hydrocarbon resin and said polybutene or polyisobutylene are dissolved in a non-reactive solvent at a concentration level of about 5 to about 25 grams per 100 ml. of non-reactive solvent, wherein, to the compositions can be optionally added an oil, and/or a filler, thereby modifying the physical properties of the pressure sensitive compositions.

A. Hydrogenated Block Copolymers

The hydrogenated block copolymers of the instant compositions are block copolymers of polystyrene and a polydiene which is typically selected from the group consisting of polybutadiene and polyisoprene, wherein the unsaturated mid block of either polybutadiene or polyisoprene are hydrogenated to yield a saturated mid block. As examples, hydrogenated block copolymers are manufactured by Shell Chemical Company and sold under the trade name: Kraton-G. The hydrogenated block copolymers have an Mn as measured by GPC of about 25,000 to about 300,000, more preferably about 30,000 to about 200,000, and most preferably about 50,000 to about 150,000.

B. Polybutene or Polyisobutylenes

Any low molecular weight polybutene polymer having a molecular weight in the range of 500 to 50,000 in appropriate portions could be used. The polybutene used in the present invention were polybutene, Oranite 32 and Oranite 128; also Indopol H-1900, which is quite similar to Oranite 128 and is produced by Amoco. Such polybutenes are composed predominantly of high molecular weight mono-olefins (85–98%) whose olefin structure is predominantly the trisubstituted type ($R-CH=CR_2$). The major component of polybutenes can be readily represented by polyisobutylene structure, and because of this similarity of polybutenes and polyisobutylenes, various grades of polyisobutylenes manufactured by various Chemical companies could be used. A blend incorporating Exxon's Vistanex-LM (Blend No. 134-2 of Table 3) was prepared for illustrative purposes. The properties of this blend, as can be seen from Table 4, are very similar to those prepared by Amoco polybutenes. As well known to those who are familiar with the art, the aggressiveness of tack and properties of most of these adhesive blends can be controlled by suitable control of the amount and type of the various ingredients used and/or by addition of effective external plasticizers.

The polybutene or polyisobutylene is incorporated into the pressure sensitive adhesive composition at a concentration level of about 25 to about 200 parts by weight of the polybutene or polyisobutylene per 100 parts by weight of the hydrogenated block copolymer, more preferably about 50 to about 100, and most preferable about 60 to about 90.

C. Commercial Tackifier Resins

To the pressure sensitive adhesive composition is added a commercial tackifying resin having a softening point of about 0° to about 160° C., more preferable about 50° to about 140° C. and most preferably about 70° to 120° C. A variety of commercial tackifier resins are available. Some of these resins contain α and/or β pinene-base polyterpene resins as the main ingredient, while others are derived from the polymerization of petroleum of coal distillates which consist of aliphatic dienes, mono- and diolefins and cyclic olefins having about 5 to about 6 carbon atoms. The latter type of tackifiers have primarily piperylene and/or isoprene structure. A general but excellent description of tackifying resins derived from Petroleum derivatives can be found in, for example, Encyclopedia of Polymer Science and Technology, Vol. 9, Pages 853 to 860, chapter by John Findlay, Published by John Wiley & Sons, NY (1968).

Typical but non-limiting trade name of these commercial tackifiers are Wingtack of Goodyear, Escorez of Exxon, Piccolyte of Hercules and Zonrez of Arizona Chemicals. Recently, these and various other companies have also started marketing relatively higher softening point resins and very light colored resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often, their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous, it spreads, the number average molecular weight $\bar{M}n$ from about 300 to about 5000 and more, preferably about 500 to about 2000 and most preferably about 700 to 1600.

Frequently, it is desirable to enhance the clear, colorless appearance of the saturated mid block Kraton polymers by using the colorless resins, e.g., hydrogenated resins such as Escorez 5380 and Escorez 5320 of Exxon Chemical Co. U.S.A. Formulations made from these compounds and, preferably, low color polybutenes, form desirable, tacky, almost colorless and aesthetically pleasing adhesives.

These hydrocarbon tackifier resins are incorporated into the pressure sensitive adhesive composition at about 50 to about 150 parts by weight per 100 parts by weight of the hydrogenated block copolymer, more preferably about 60 to about 125 and most preferably about 75 to about 100.

E. Extended Blend Adhesive Composition

To the composition of the pressure sensitive adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at about 1 to about 150 parts by weight per 100 parts by weight of the hydrogenated block copolymer, more preferably at about 30 to about 100. Typically, these fillers have a particle size of about 0.03 to about 20 microns, more preferably about 0.3 to about 10, and most preferably about 0.5 to about 10. The oil absorption, as measured by grams of oil absorbed by 100 grams of filler, is about 10 to about 100, more preferably about 10 to about 85 and most preferably about 10 to about 75. Typical fillers employed in this invention are illustrated in Table I.

F. Oil Extended Adhesive Compositions

It is observed that the composition of the instant invention can also include oils to further improve low temperature properties and tack characteristics of the resulting adhesive levels of oil of less than about 25 parts by weight per 100 parts of the hydrogenated block copolymer can be incorporated, more preferably about 1 to about 20 parts. Oils are particularly useful when high levels of petroleum resin tackifiers are used since such materials can harden the resulting composition. Oils can usually further soften and reduce the cost. In some cases, oils can significantly contribute to the degree of tackiness in the final product and thus are helpful in formulating various adhesive products.

TABLE I

| Filler | Code | of oil/100 grams of filler | Specific Gravity | Avg. Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

However, in the present case, if used without the polybutene present, the resulting pressure sensitive adhesive properties are, overall, poorer. Typical oils that can be used may be low viscosity aromatic, naphthenic or paraffinic petroleum oils, having less than 2 weight percent polar type compounds. Typical oils are illustrated in Table II.

DETAILED DESCRIPTION OF THE INVENTION

The advantages of both the physical properties and adhesive characteristics of the compositions of the present invention can be more readily appreciated by references to the following Examples and Tables. Unless otherwise defined, the measurements of the compositions are in parts per hundred by weight.

TABLE II

| Type Oil | Oil Code # | Viscosity ssu | Mn | % Polars | % Aromatic | % Saturate |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

EXAMPLE 1

The binary blends of Kraton G polymer and tackifying resins failed to show any respectable degree of tackiness; attempts were made to make tertiary blends of Kraton G, tackifying resins and polybutenes.

In Table III, various tertiary (adhesive) blend compositions of Kraton G system are shown. In this series of experiments, it has been shown that besides Kraton G and tackifying resins, a low molecular weight polymer, polybutene must be added. All the blends incorporating polybutene were compatible. Blend No. 132-11, which is a binary blend of Kraton G and a polybutene (H-1900), is included in this Table for comparative purposes. Because of the low molecular weight nature of polybutene, the blend No. 132-11 is somewhat poor in its green strength, as compared to other blends having similar compositions.

Table IV illustrates the properties of various blends of Table III. It is clear, from the last column of Table IV, that all the blends exhibit significant improvements in their tackiness upon incorporation of polybutene. The addition of an equal amount of polybutene, as that of Escorez or Arkon resins used in formulating in the binary adhesive blends improves significantly the tack of the final product. This is especially true for 50—50 blends of Kraton G and resins.

The exact and detailed procedure for preparing the blends of above and following Tables is not a crucial component of the present invention. The blends could easily be prepared by dissolving the desired quantities of various ingredients in a suitable organic solvent. The blends can, if desired, be applied to a backing to form a pressure sensitive sheet with a film of adhesive, generally 1–2 mil on the backing. They can also be made by applying a solution of 5–10 mil to the backing, and flashing off the solvent to form 1–2 mil film of adhesive on the backing.

The bond strength values reported in Table IV, and subsequent Tables, were obtained by a method similar to ASTM D-429 adhesion tests. In brief, the samples were sandwiched between mylar sheets and pressed to a thickness of about 25 mils using a hot press. Rectangular strips of ½ inch width and 3 inches long were cut and 90° peel tests were performed on an Instron at room temperature. The resin-free sections of the mylar film were clamped into air jaws to avoid any slippage during pulling. The samples were pulled at 5 inches/minute crosshead speed. The force and elongation of the samples were recorded on a strip recorder. The force necessary to separate the mylar sheets was taken as the bond strength of the blend and a measure of its cohesive strength and adhesive nature. The final plateau values are reported. The qualitative nature of the tackiness of the blends were determined by technician's subjective "finger test" method.

TABLE III

COMPOSITION OF TERTIARY BLENDS OF KRATON G, TACKIFYING RESINS AND LOW MOLECULAR WEIGHT POLYBUTENES

| Blend Number | 132-10 | 132-11* | 133-1 | 133-2 | 133-3 | 133-4 | 134-1 |
|---|---|---|---|---|---|---|---|
| Kraton G | 100 | 100 | 100 | 100 | 100 | 100 | 100 |
| Irganox | 1 | 1 | 1 | 1 | 1 | 1 | — |
| Escorez 1310 | 100 | — | — | — | — | — | 100 |
| Escorez 5380 | — | — | 60 | 100 | — | — | — |
| Arkon P-85 | — | — | — | — | 60 | 100 | — |
| Polybutene (H-1900)** | 100 | 100 | 100 | 100 | 100 | 100 | — |
| Vistanex LM*** | — | — | — | — | — | — | 100 |

*This binary blend is included here for comparative purposes (see text for details).
**Polyisobutylene, a product of Amoco.
***Polyisobutylene, a product of Exxon.
All these samples were melt mixed on a hot mill roll at about 150° C.

TABLE IV

QUALITATIVE AND QUANTITATIVE PROPERTIES OF BLENDS OF TABLE III

| Blend Number | Bond Strength (lbs.) | Clarity* | Mode of Failure*** | Tackiness*** |
|---|---|---|---|---|
| 132-10 | 2.8 | Clear/Very Light Yellow** | A.F. | Tacky |
| 132-11 | 0.5 | Clear/Transparent | A.F. | Non-Tacky |
| 133-1 | 2.5 | Clear/Transparent | A.F. | Non-Tacky |
| 133-2 | 3.7 | Clear/Transparent | A.F. | Tacky |
| 133-3 | 2.4 | Clear/Transparent | A.F. | Very Slightly Tacky |
| 133-4 | 3.8 | Clear/Transparent | A.F. | Tacky |
| 134-1 | 1.7 | Clear/Very Light Yellow | A.F. | Slightly Tacky |

*Clarity of the film pressed in between mylar sheets.
**Due to the color of the resin.
***See footnotes of Table II.

Kraton G is a block copolymer of the structure ABA in which A is a block of styrene (total 15% by weight) whose number average molecular weight is in the range of 10,000 to 30,000. B is a block of hydrogenated polybutadiene in polyisoprene (85%) having a number average molecular weight of about 125,000. Vistanex-LM is a low molecular polyisobutylene and is an Exxon proprietary material described in detail in various U.S. patents. Amoco polybutenes are viscous, non-drying, water white, liquid butylene polymers. They are composed predominantly of high molecular weight mono-olefins (85–98%), the balance being isoparaffinic. The major component of Amoco polybutenes can be represented by polyisobutylene structure. Arkon P-85 and Escorez resins are commercial tackifiers having a melting point in the neighborhood of 80°–90° C. These are hydrocarbon resins derived from petroleum or coal tar distillates, aliphatic dienes and mono-olefins of 5 or 6 carbon atoms.

EXAMPLE 2

In this series of tests, various binary blend compositions of Kraton G and tackifying resins incorporating two types of oils: Tufflo and Shellflex, as an example, were prepared. The composition of such blends and various adhesive characteristics thereof are shown in Table V. These tests were run with mylar coated sheets having 1–2 mil films of adhesive on the plastic backing. The tests used are those published by the Pressure Sensitive Tape Council (PSTC) and widely used in the adhesive industry. They are identified in the footnotes. It is observed that with no additives, which is especially true for low oil loadings, the films are dry. The films prepared from these compositions exhibit poor tack, as determined by polyken tester. Only compositions having high levels of oil (50 phr) exhibit somewhat improved rolling ball tack, but nevertheless, these compositions exhibit poor polyken peel and quick stick adhesive characteristics.

EXAMPLE 3

Various adhesive blend compositions and their properties of this Example are shown in Table VI. In this case, again, the samples were prepared by adding a solution of the blend in toluene to mylar film forming a 5–10 mil film with a blade drawn across the solution, and quickly entering an oven to evaporate the solvent, recovering a 1–2 mil organic film with pressure sensitive adhesive properties. In these experiments, in some compositions of Table VI, an extra additive polybutene (Oranite 128) was added. As can be clearly seen, the addition of this ingredient inparts significant improvements in the adhesive properties of compositions of the previous Table. In particular, it is observed that the polyken tack is doubled from the previous compositions. The polybutene also improves the rolling ball tack.

TABLE V

COMPARISON OF OIL LEVEL ON KRATON G TACKIFICATION
1.5 Mil Film Made From Toluene Solutions of Elastomer etc.

| Resin Formulation | | | | | | | | | | | | | | |
|---|---|---|---|---|---|---|---|---|---|---|---|---|---|---|
| Kraton G-1657 | | | | | | | | 100 | | | | | | |
| Resin, phr | | | | | | | | | | | | | | |
| Escorez 5380 | 60 | 80 | 80 | 80 | 75 | 100 | 125 | — | — | — | — | — | — | — |
| Arkon P-85 | — | — | — | — | — | — | — | 60 | 80 | 80 | 80 | 75 | 100 | 125 |
| Additive | | | | | | | | | | | | | | |
| Tufflo G056 | 10 | 10 | 20 | — | 50 | 50 | 50 | 10 | 10 | 20 | — | 50 | 50 | 50 |
| Shellflex 371 | — | — | — | 20 | — | — | — | — | — | — | 20 | — | — | — |
| Adhesive Properties | | | | | | | | | | | | | | |
| Rolling Ball Tack, cm (b) | 14 | 10 | 9.5 | 10 | 5 | 8.5 | 15 | 12.5 | 30+ | 9.5 | 9.5 | 5 | 6 | 17 |
| Polyken Tack, gm/cm² (c) | (a) | (a) | (a) | (a) | 200 | 250 | 200 | (a) | (a) | (a) | (a) | 275 | 330 | 43 |
| 90° Quick Stick, lbs/in² (e) | 0.3 | 0.3 | 0.2 | 0.8 | 0.2 | 0.4 | 0.2 | 0.1 | 0.3 | 0.7 | 0.5 | 0.4 | 0.7 | 0.3 |
| Peel, lbs/in² (d) | — | 0.6 | 0.2 | 1.8 | 0.3 | 0.5 | 0.3 | 0.1 | 2.4 | 1.9 | 0.3 | 0.5 | 1.3 | 0.8 |

(a) Not measured. Dry or poor "finger tack".
(b) PSTC-6
(c) ASTM D-2979
(d) PSTC-1
(e) PSTC-5

TABLE VI

EFFECT OF POLYBUTENE ADDITIVES ON THE KRAT G TACKIFICATION

| PSA formulation | | | | | | | | | | |
|---|---|---|---|---|---|---|---|---|---|---|
| Kraton G-1657 | 100 | | | | | | | | | |
| Resin, phr | | | | | | | | | | |
| Escorez 5380 | 60 | 60 | 100 | 100 | 100 | — | — | — | — | — |
| Arkon P-85 | — | — | — | — | — | 60 | 60 | 100 | 100 | 100 |
| Escorez 1310 | — | — | — | — | — | — | — | — | — | — |
| Additive | | | | | | | | | | |
| Tufflo G056 (a) | — | 10 | — | 50 | — | — | 10 | — | 50 | — |
| Oranite 128 (b) | — | — | — | — | 50 | — | — | — | — | 50 |
| PSA Properties | | | | | | | | | | |
| Rolling Ball Tack, cm | 12 | 10 | 18 | 8.5 | 5.5 | 1.7 | 12.5 | 30+ | 6 | 13 |
| Polyken Tack gms/cm² | (c) | (c) | (c) | 250 | 585 | (c) | (c) | (c) | 330 | 700 |
| 90° Quick Stick lbs/in² | 0.6 | 0.3 | 1.3 | 0.4 | 1.1 | 1.4 | 0.6 | 0.6 | 0.7 | 1.8 |
| Peel lbs/in² | 1.0 | 0.5 | 2.3 | 0.5 | 2.6 | 2.3 | 0.1 | 1.4 | 1.3 | 2.7 |

(a) Napthenic Oil
(b) High molecular weight polybutene
(c) Not measured. Dry, poor "finger tack"

EXAMPLE 4

The data of these experiments are illustrated in Table VII and VIII. In Table VII, direct comparisons of oil containing adhesive blend compositions incorporating two different grades of polybutenes are shown. As seen in previous examples, it is observed that polybutene improves polyken tack, quick stick and peel strength of the adhesive compositions. Comparing the two polybutenes, it is noticed that the higher molecular weight polybutene is somewhat better in improving the tack characteristics than the low molecular weight polybutene in these formulations. In Table VIII, comparative data of two tackifying resins differing in their softening point are shown. It is observed that the peel strength of these two types of blends is more or less equal. However, the low softening point resin sample tends to form compositions which are somewhat better in regard to their rolling ball tack. The other important point to note is that both resins respond to polybutenes better than oils (e.g., Examples 2 and 3) as judged from the polyken test and quick stick measurements of these samples.

TABLE VII

COMPARISON OF TWO 85° C. SOFTENING POINT RESINS
1.5 Mil Film Made From Toluene Solutions of Elastomer etc.

| Resin Formulation | | | | | | | | | | | | |
|---|---|---|---|---|---|---|---|---|---|---|---|---|
| Kraton G-1657 | 100 | | | | | | | | | | | |
| Resin phr. | | | | | | | | | | | | |
| Escorez 5380 | 75 | 75 | 75 | 100 | 100 | 100 | — | — | — | — | — | — |
| Arkon P-85 | — | — | — | — | — | — | 75 | 75 | 75 | 100 | 100 | 100 |
| Additive | | | | | | | | | | | | |
| Oranite 32 (a) | 50 | — | — | 50 | — | — | 50 | — | — | 50 | — | — |
| Oranite 128 (b) | — | 50 | — | — | 50 | — | — | 50 | — | — | 50 | — |
| Tufflo G056 (c) | — | — | 50 | — | — | 50 | — | — | 50 | — | — | 50 |
| Adhesive Properties | | | | | | | | | | | | |
| Rolling Ball Tack, cm | 6 | 8 | 5 | 7.5 | 5.5 | 8.5 | 10 | 15 | 5 | 18 | 13 | 6 |
| Polyken Tack gm/cm² | 375 | 450 | 200 | 450 | 585 | 250 | 410 | 570 | 275 | 450 | 700 | 330 |
| 90° Quick Stick lbs/in² | 0.8 | 1.0 | 0.2 | 1.0 | 1.1 | 0.4 | 1.1 | 1.2 | 0.4 | 1.3 | 1.8 | 0.7 |
| Peel, lbs/in² | 1.4 | 2.0 | 0.3 | 2.3 | 2.6 | 0.5 | 1.7 | 2.4 | 0.5 | 2.3 | 2.7 | 1.3 |

(a) Low MW Polybutene
(b) High MW Polybutene
(c) Naphthenic Oil

TABLE VIII

COMPARISON OF 85° C. AND 125° C. SOFTENING POINT RESINS
1.5 Mil Films Made From Toluene Solution of Elastomer etc.

| Resin Formation | | | | | | | | | | | | |
|---|---|---|---|---|---|---|---|---|---|---|---|---|
| Kraton G-1657 | 100 | | | | | | | | | | | |
| Resin, phr | | | | | | | | | | | | |
| Escorez 5380 (a) | 75 | 75 | 75 | 100 | 100 | 100 | — | — | — | — | — | — |
| Escorez 5320 (b) | — | — | — | — | — | — | 75 | 75 | 75 | 100 | 100 | 100 |
| Additive | | | | | | | | | | | | |
| Oranite 32 (c) | 50 | — | — | 50 | — | — | 50 | — | — | 50 | — | — |
| Oranite 128 (d) | — | 50 | — | — | 50 | — | — | 50 | — | — | 50 | — |
| Tufflo G056 (e) | — | — | 50 | — | — | 50 | — | — | 50 | — | — | 50 |
| Adhesive Properties | | | | | | | | | | | | |
| Rolling Ball Tack, cm | 6 | 8 | 5 | 7.5 | 5.5 | 8.5 | 11 | 23 | 6.8 | 30 | 30 | 12 |
| Polyken Tack gms/cm² | 375 | 450 | 200 | 450 | 585 | 250 | 480 | 600 | 251 | 500 | 740 | 345 |
| 90° Quick Stick lbs/in² | 0.8 | 1.0 | 0.2 | 1.0 | 1.1 | 0.4 | 0.7 | 1.4 | 0.3 | 1.4 | 1.8 | 0.4 |

TABLE VIII-continued
COMPARISON OF 85° C. AND 125° C. SOFTENING POINT RESINS
1.5 Mil Films Made From Toluene Solution of Elastomer etc.

| Peel, lbs/in$^2$ | 1.4 | 2.1 | 0.3 | 2.3 | 2.6 | 0.5 | 1.9 | 1.3 | 0.4 | 1.4 | 2.2 | 1.3 |
|---|---|---|---|---|---|---|---|---|---|---|---|---|

(a) 85° C. Softening Point Resin
(b) 125° C. Softening Point Resin
(c) Low MW Polybutene
(d) High MW Polybutene
(e) Naphthenic Oil

What is claimed is:

1. A solvent based pressure sensitive adhesive composition which comprises:
   (a) a hydrogenated block copolymer of polystyrene and a hydrogenated polydiene, said diene being selected from the group consisting of poly-butadiene and polyisoprene;
   (b) about 25 to about 250 parts by weight of a hydrocarbon resin of a petroleum or coal tar distillate per 100 parts by weight of said hydrogenated block copolymer;
   (c) about 25-200 parts by weight of polybutene or polyisobutylene per 100 parts of said hydrogenated block copolymer; and
   (d) a non-reactive solvent, the mixture of said hydrogenated block copolymer, said hydrocarbon resin, and said polyisobutylene or said polybutene being dissolved in a non-reactive solvent at a concentration level of about 5 to about 25 grams per 100 ml/non-reactive solvent.

2. An composition according to claim 1 further including about 1 to about 150 parts by weight of a filler per 100 parts by weight of said hydrogenated block copolymer, said filler being selected from the group consisting of calcium carbonates, silicas, carbon blacks, clays and talcs and mixtures thereof and/or less than about 100 parts by weight of an oil having less than 2 weight percent per 100 parts by weight of said hydrogenated block copolymer.

3. An adhesive composition according to claim 1 or 2 wherein said hydrocarbon resin is made from monomers with 5 to 6 carbon atoms and consists of aliphatic dienes, mono and diolefins and cyclic olefins.

4. An adhesive composition according to claim 1 further including about 1 to about 150 parts by weight of a filler per 100 parts by weight of the hydrogenated block copolymer.

5. An adhesive composition according to claims 1 or 4 further including less than about 25 parts by weight of an oil per 100 parts by weight of the hydrogenated block copolymer.

* * * * *